March 12, 1929.　　　C. R. GRIFFITH　　　1,705,328
CANDY MOLD
Filed Dec. 5, 1923
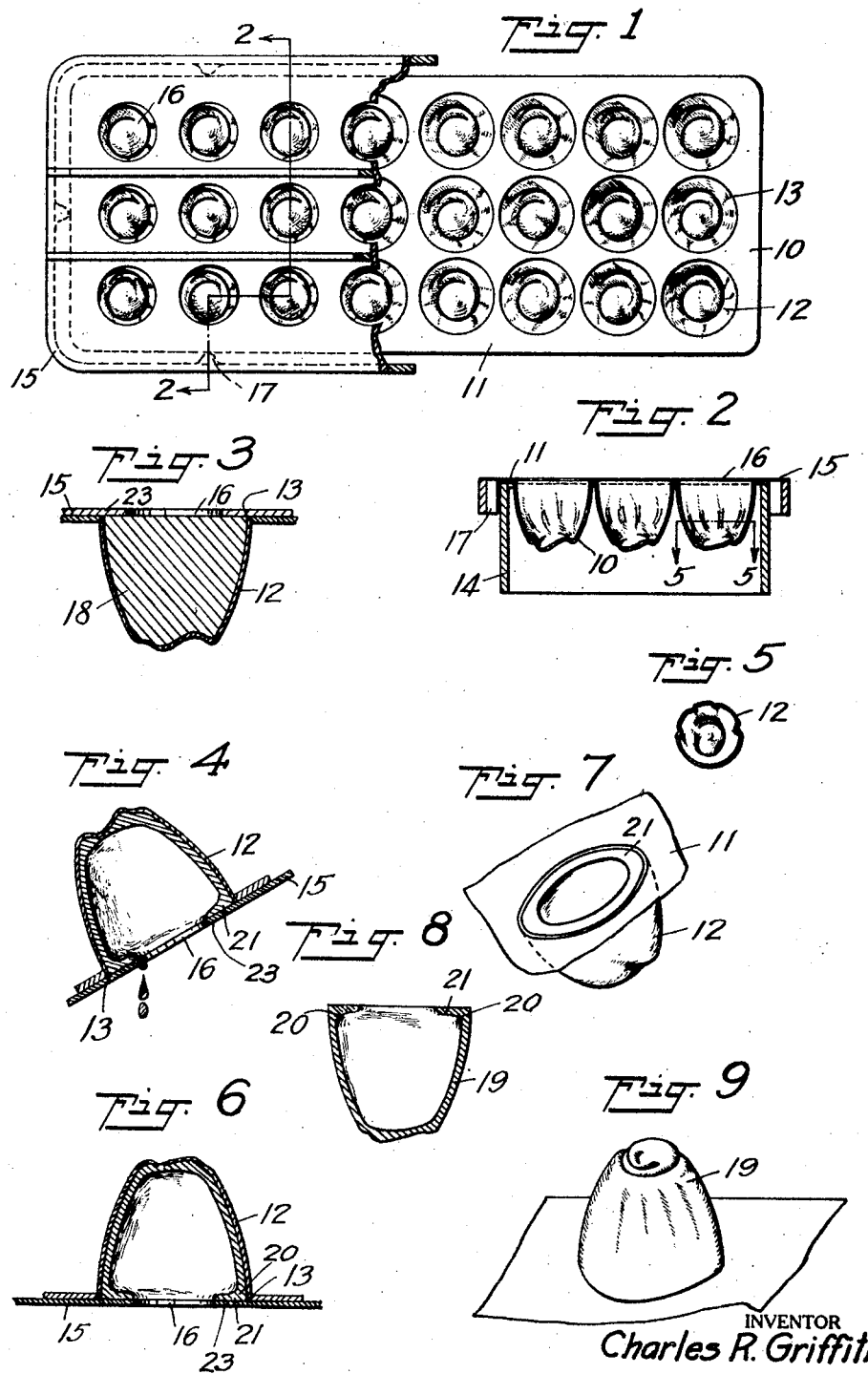
INVENTOR
Charles R. Griffith
BY
Harry Jacobson
ATTORNEY Patented Mar. 12, 1929.

1,705,328

UNITED STATES PATENT OFFICE.

CHARLES R. GRIFFITH, OF NEW YORK, N. Y.

CANDY MOLD.

Application filed December 5, 1923. Serial No. 678,722.

This invention relates to molds for the manufacture of candy shells, and particularly to that type adapted to form a chocolate shell, such as is described in my copending application filed concurrently herewith.

Confections having a chocolate covering and contents of hard or pasty material, such as nuts, fruits, or confectioner's cream, have been made by first making the contents or centers of sufficient consistency to allow the handling thereof, and then dipping said centers into molten chocolate, whereby the centers are entirely covered with a chocolate coat. It is therefore apparent that chocolate covered confections with liquid, syrup or other viscous contents cannot be made by the above described process. Said process by which the confection is made, must be carried out manually, largely by highly skilled labor, and is therefore expensive. To reduce the expense incident to hand dipping and handling, attempts have been made to manufacture the chocolate shell first and then to fill said shell with whatever material of which the contents are to consist. These previous attempts have been uniformly unsuccessful because the shells and the mold used for making them are both defective in numerous respects as will appear hereinafter.

The principal objection to chocolate shells as formed in the molds previously made, is that it is difficult if not impossible to remove the shell intact from the mold, after the chocolate has hardened or set. This difficulty I have overcome by the use of my improved mold; one of the objects of which is to provide means whereby the shell made therein is at least as thick or thicker near its lowermost portion as it is elsewhere.

A further object of my invention is to provide means wherein a finished shell of perfect configuration is made without the necessity for later trimming, and which means can be utilized with economy and rapidity, by unskilled labor.

A further object of my invention is to provide means for rapidly and efficiently forming a chocolate shell, from which means said shell may be quickly and easily removed without danger of breaking.

A still further object of my invention is the provision of means for making a chocolate shell with a portion of the base integral with the remainder of said shell.

For the attainment of the aforesaid and other objects as will appear hereinafter, I employ the devices shown in the preferred forms in the accompanying drawing, in which, Fig. 1 is a top plan of my improved gang mold for making a number of my improved shells, the cover plate being illustrated partly broken away to expose the underlying individual forms. Fig. 2 is a vertical section of the same on the line 2—2 of Fig. 1. Fig. 3 is a vertical section of an individual form as it appears after molten chocolate has been poured thereinto and the cover placed thereon. Fig. 4 is a similar view of the same as the form appears during one of the steps of my improved process wherein the mold is being inverted. Fig. 5 is a horizontal section of one of the forms on the line 5—5 of Fig. 2. Fig. 6 is a vertical section similar to Fig. 4 showing the mold and the shell, the surplus chocolate having been drained and said shell is ready to set. Fig. 7 is a perspective view of one of the forms and shell as it appears during the process of turning the mold into the initial position thereof. Fig. 8 is a vertical section of the finished shell, and Fig. 9 is a perspective view of the same.

In the practical embodiment of my invention, I employ preferably a gang mold as 10 wherein an upper flat surface 11 is provided and wherein a series of similar forms as 12 are suitably secured preferably in spaced relation to each other. The upper rim 13 of each of said forms 12 is made sharp for the purpose which will be pointed out hereinafter.

Suitable vertical walls as 14 secured to the upper face 11 of the mold may be used as a stand so that said mold may be rested on a working table, not shown, at a suitable working height.

A flat cover plate 15, having openings 16 therein arranged with the same distance between centers as there is between the centers of the forms 12, is adapted to be placed on the flat surface 11 of the mold 10 and when so placed is in close contact with the surface 11, and thereby prevents any molten chocolate from reaching said surface when said plate is on the mold. Said openings 16 are preferably substantially smaller in diameter than the upper rim 13 of the forms, the difference in diameters of said rim 13 and said openings being greater than the thickness of the shell body, so that a base 21 of a width greater than the thickness of the shell body is formed by my improved mold as will be explained hereinafter. Guide lugs as 17 engaging the walls 14 are preferably provided to locate said openings in proper operative position relatively to said forms 12.

My improved mold is used as follows:

The cover plate 15 having been removed from the mold 10 (right half of Fig. 1) molten chocolate as 18 is poured into the form 12 until said chocolate fills said form completely. The cover plate 15 is then placed on said mold 11, being guided into proper registration by means of the lugs 17 engaging the walls 14. It will be seen that no chocolate can flow between the cover plate 15 and the face 11 of the mold because of the close contact between said plate and said face (Fig. 3). The filled mold together with the cover plate are then inverted (Fig. 4) whereupon that part of the molten chocolate which has not stuck to the inner surface of the form 12 and the plate 15 is drained off through the opening 16. (Figs. 4 and 6.) However, sufficient chocolate does stick to the form and to the plate to form a shell 19 substantially thicker at the point 20 thereof nearest the rim 13 than at any other portion of the shell, due to the supporting effect on the chocolate, of the rim 23 of that part of the plate between the circumference of the opening 16 and the rim 13. The mold is allowed to remain in its inverted position until all the superfluous chocolate has drained from the form and is then re-inverted back to its initial position, after which the mold is preferably cooled to hasten the setting of the shell. It is well known that during the setting or cooling process, chocolate shrinks a substantial amount depending on the amount of chocolate used. It will be understood that the greater the thickness of the chocolate the greater is the shrinkage thereof in setting. I take advantage of this characteristic of chocolate by making my improved shell of substantial thickness throughout. Sufficient shrinkage therefore takes place to cause said shell to withdraw from the form wherein it is cast for practically the entire surface thereof. It will be understood that while chocolate is the preferred material for the shell, any other candy having the properties described, may be used if desired.

In means and processes wherein no cover plate is used, the form is inverted to drain off the molten chocolate, and then re-inverted for setting, the thickness of the resulting shell ordinarily is least at or near the rim 13, at the point however, where the thickness of my improved shell is greatest. The result of previous attempts to manufacture shells, is that practically no shrinkage takes place at or near the rim, and that the removal of the shell from the form without damage to said shell is practically impossible, because of the adherence of the thin rim of the shell to the form.

The use of my improved cover plate also causes a horizontal base as 21 of an inner diameter substantially that of the opening 11 to be formed on the shell. Said base makes the sealing of said shell after the contents have been inserted much simpler and easier than is possible in a shell where no base is provided.

By making the rim 13 of the form 12 sharp, I am enabled to form a perfect shell without unsightly flanges of waste material projecting outwardly therefrom as would be the case were the corner 13 rounded to any extent, and the chocolate allowed to flow over the rim 13.

After the chocolate has drained sufficiently from the form 12, (Fig. 6) the mold containing the shells, together with the cover plate is again inverted back to its initial position and the shells allowed to set (Fig. 7). The cover plate is then readily removed after first tapping said plate to jar the base 21 of the shell loose from said plate, it being well known that chocolate after setting may be easily separated from material to which it sticks when molten.

The finished shells may then be removed from the mold by first inverting and then tapping the mold to jar the shells loose whereupon said shells drop out (Fig. 9) without difficulty, due particularly to the fact that my improved shell is formed with a sufficient thickness of material throughout to allow the finished shell to shrink away from the form into which it is cast.

It will be seen that the product of my improved mold is strong and perfectly shaped without projections at the base, that the mold is well adapted for effective operation by unskilled labor with rapidity and efficiency, and that the product is quickly and easily removed from the mold on the setting of the chocolate.

It will also be understood that candy other than chocolate may be used in connection with my improved mold, if desired, without departing from the scope of this invention as set forth in the appended claims.

I claim:

1. A mold for casting candy shells having thin walls and an apertured flat base overhanging said walls, comprising a form open at the top and a removable cover plate having an aperture therein of approximately half the greatest diameter of said form arranged with the aperture thereof arranged concentrically with and over the open top of said form, and a flat under surface on said plate outside of said aperture adapted to project over the rim of said form at the top thereof for catching material dropped thereon on the inversion of said mold, whereby the base is formed on said shell.

2. In a mold for casting candy shells having a thin wall, a form for said shells, means for supporting said form, a flat apertured upper surface in which said form terminates and a removable cover plate having an aperture therein of a diameter not greater than half the greatest diameter of said form adapted to partly cover the aperture of said form by inwardly overhanging the upper edge of said form for catching and retaining material drained from the form on the inversion thereof whereby a base inwardly overhanging said wall is formed when said form is drained.

CHARLES R. GRIFFITH.